(12) United States Patent
Crosby (10) Patent No.: US 11,490,992 B1
(45) Date of Patent: Nov. 8, 2022

(54) DENTAL TOOL SUPPORT

(71) Applicant: Courtney Crosby, The Colony, TX (US)

(72) Inventor: Courtney Crosby, The Colony, TX (US)

( * ) Notice: Subject to any disclaimer, the term of this patent is extended or adjusted under 35 U.S.C. 154(b) by 273 days.

(21) Appl. No.: 16/849,964

(22) Filed: Apr. 15, 2020

Related U.S. Application Data (66) Substitute for application No. 16/196,904, filed on Nov. 20, 2018, now Pat. No. 10,792,135.

(51) Int. Cl.
*A61C 1/00* (2006.01)
*A61C 1/14* (2006.01)
*F16M 13/02* (2006.01)

(52) U.S. Cl.
CPC ............. *A61C 1/14* (2013.01); *F16M 13/022* (2013.01)

(58) Field of Classification Search
CPC ........ F16M 13/022; A61C 17/04; A61C 1/14; A61C 17/0208; A61C 17/0202
See application file for complete search history.

(56) References Cited

U.S. PATENT DOCUMENTS

| | | | | |
|---|---|---|---|---|
| 2,947,564 A * | 8/1960 | Winther | ............. | B25J 1/04 |
| | | | | 294/100 |
| 3,869,796 A * | 3/1975 | Thorburn | ............. | B23B 31/202 |
| | | | | 433/129 |
| 5,127,830 A * | 7/1992 | Sheridan | ............. | A61G 15/16 |
| | | | | 433/79 |
| 5,572,913 A * | 11/1996 | Nasiell | ............. | B25B 13/481 |
| | | | | 81/177.6 |
| 8,096,807 B2 * | 1/2012 | Benfield | ............. | A61C 17/06 |
| | | | | 433/92 |
| 2004/0025641 A1* | 2/2004 | Sugano | ............. | H01K 3/32 |
| | | | | 81/53.11 |
| 2013/0099081 A1* | 4/2013 | Agbodoe | ............. | F16M 11/40 |
| | | | | 248/276.1 |
| 2014/0137811 A1* | 5/2014 | Kovarik | ............. | A63B 47/02 |
| | | | | 119/796 |

* cited by examiner

*Primary Examiner* — Steven O Douglas
(74) *Attorney, Agent, or Firm* — Jeffrey Roddy (57) ABSTRACT

A flexible support for a dental tool includes a distal holder configured to securely hold the dental tool which may be quickly released, the flexible support includes an anchoring member configured to fit snugly within a tool recess of a tool cradle, the flexible support includes a tightener member adapted to secure the anchoring member with the tool recess.

3 Claims, 11 Drawing Sheets

DENTAL TOOL SUPPORT

CROSS REFERENCES TO RELATED APPLICATIONS

This Non-Provisional Utility Application is a Continuation-in-part of U.S. Non-Provisional application Ser. No. 16/196,904 entitled "Dental Tool Support," filed Nov. 20, 2018, which claims the benefit of U.S. Provisional Application No. 62/258,445 entitled "Dental Tool Support" filed Nov. 20, 2017.

FIELD OF THE INVENTION

The present invention relates generally to an apparatus for configured to support a dental suction tool.

BACKGROUND OF THE INVENTION

Dental suction devices are used to remove saliva from a patient's mouth during dental hygiene procedures, e.g., cleaning, are classified generally as LVE "low volume evacuators." Such dental suction devices typically include a handpiece with a valve control switch, a nozzle called a "saliva ejector" and a vacuum hose. Typically, the dental suction device is supplied in a set that also includes a water syringe tool and both are usually maintained in an upright position in a tool cradle or dock that is designed to loosely secure the tools for ready access. Although there are many different manufacturers of dental hygienist/dental assistant tools and corresponding tool cradles, the shape of the tool handles tend to be somewhat similar irrespective of the make or model. Accordingly, because the tool cradles are configured to easily receive and release the tools by supporting the tool handles in a readily releasable upright position, most tool cradles tend to possess similar morphology—a generally conic cavity with the greater diameter of the cavity facing up. Typically, during a single cleaning procedure, a dental hygienist/dental assistant may go back and forth multiple times to and from the tool cradle to dock and retrieve the particular tool being used. Due to time constraints, the position of the dental hygienist/dental assistant in relation to the patient, or the inability to position the tool cradle within reach, the hygienist may resort to simply keeping the suction device in his or her lap for better access than what is provided by the tool cradle.

Accordingly, what is needed is flexible holder for a suction device that maintains the suction device in a ready position directly adjacent the work area, e.g., a patient's mouth.

It would be desirable if the flexible support were capable of pivoting toward and away from the work area.

It would be desirable if the forgoing flexible support were to include a quick release tool grip at one end of a flexible support to allow for the quick attachment and detachment of a dental suction device to a distal end of the holder.

It would be desirable if the foregoing flexible support were to include a quick release cradle grip at a proximal end of the flexible support configured to tightly fill the space usually occupied by the dental suction device when the device is not in use.

It would be desirable if the foregoing quick release cradle grip were configured to adapt to any tool cradle shape or size.

It would be desirable if anchoring portions of the foregoing flexible support were configured to firmly grip and bind to portions of a tool cradle, being laterally immobilized therein, when portions flexible support are pushed downwardly, and to release from the sides of the tool cradle when portions of the flexible support are pulled upwardly by the dental hygienist/dental assistant or the dentist.

SUMMARY OF THE INVENTION

In a general example implementation according to the present invention, a flexible support for a dental tool provides a quick attachment and release feature for a dental tool secured at a distal end of the flexible support and a quick attachment and release feature for an anchoring portion at a proximal end of the flexible support.

In a general aspect combinable with any other aspect, a flexible member is configured to hold a set position. The flexible member is attached to an anchoring portion that includes a conformable member at a proximal end of the flexible member. The conformable member includes a central axis.

In an aspect combinable with any other aspect, one or more displaceable members and one or more slip resistant portions circumjacent the axis enable the conformable member to tensionably conform to sides of a dental tool holder or tool cradle when the conformable member is pressed into a tool recess of the cradle.

In an aspect combinable with any other aspect, some displaceable members may, when pressed into the tool recess of the cradle, be forced from a position relatively close to the axis to a position further away from the axis, thereby forcing portions of the conformable member into a friction fit with the tool recess of the cradle.

In an aspect combinable with any other aspect, the proximal end of the flexible member may be coaxial with the conformable member.

In an aspect of the present invention, combinable with any other aspect, some displaceable members may abut or otherwise interact with the proximal end of the flexible member within the conformable member.

In an aspect combinable with any other aspect, movement of the proximal end of the flexible member within the conformable member may displace one or more displaceable members.

In an aspect combinable with any other aspect, the displaceable members may be displaced radially by the downward moment of the proximal end of the flexible member within the conformable member.

In an aspect combinable with any other aspect, the displaceable members may move closer to the axis of the conformable member when the proximal end of the flexible member is retracted.

In an aspect combinable with any other aspect, the displaceable members may be a plurality of spherical beads within a lubricious matrix that retract generally toward the axis when the proximal end of the flexible member is retracted from a prior down position.

In an aspect combinable with any other aspect, the displaceable members may be a plurality of slidable members that include a back and forth reciprocating motion when the proximal end of the flexible member within the conformable member is pulled up or forced downwardly which may be by pushing the flexible member from the top or pulling the flexible member from the bottom of portions extend from the bottom of the tool holder apparatus.

In an aspect combinable with any other aspect, an outer portion of the conformable member may include a non-slip layer which may be an elastomeric composition.

In an aspect combinable with any other aspect, the displaceable members may reside beneath an elastomeric cover.

In an aspect combinable with any other aspect, a distal end of the flexible member includes a tool attachment member for the handle portion of a dental tool.

In an aspect combinable with any other aspect, the tool attachment member for the dental tool handle includes portions that partially conform to the dental tool handle.

In an aspect combinable with any other aspect, the tool attachment member for the dental tool handle may include soft compressible portions that partially conform to the handle.

In an aspect combinable with any other aspect, the flexible member may have a passageway for the passing through of a hose.

In an aspect combinable with any other aspect, the conformable member may have a passageway for the passing through of a hose.

In an aspect combinable with any other aspect, the conformable member may be segmented, the segmented portions movable in relation to one another.

In an aspect combinable with any other aspect, the tool attachment piece for the dental tool handle may include a magnetic catch.

In an aspect combinable with any other aspect, the tool attachment piece for the dental tool handle may include a magnetic catch that interacts with a magnetic member placed on the handle.

It will be appreciated by those having skill in the art that the overall size and dimensions of the flexible support for a dental tool may vary.

The foregoing and other objects, features, and advantages of the invention will become more apparent from the following detailed description, which proceeds with reference to the accompanying figures wherein the scale depicted is approximate.

DETAILED DESCRIPTION OF THE INVENTION

Reference Listing of Elements

ST suction tool
H hose
TC tool cradle
TS tool stand
TR tool receptacle
100 flexible tool holder
112 flexible arm
113a lower end
113b proximal end
114 flexible arm sheath
115 passageway
116 upper tool grip
118a, 118b tool attachment piece
120 access window
121 compressible or magnetic member
122 hinging portion
123 anchor member
124 conformable member
125 aperture
126 displaceable member
127 axis
128 bearing
129 central member
130 elastomeric layer
131 beads
132 passageway
134 spring recess
136 spring flange
138 tensioner Definitions Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. It should be understood that the objects, features and aspects of any embodiment disclosed herein may be combined with any object, feature or aspect of any other embodiment without departing from the scope of the invention. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1-16 which show various implementations according to the present invention, a dental tool support (100) includes a flexible arm (112), sometimes termed a "gooseneck," covered by a sheath (114) thereabout, a proximal end of the flexible arm is connected to an anchor member (123) which may include a conformable member (124). A distal end of the flexible arm (112) includes a dental tool clamp, seat or upper tool grip (116) that includes at least one attachment piece (118a, 118b). In some implementations, anchor member (123) includes an axis (127) corresponding generally to the position of a central member (129) within the anchor member, wherein the central member is connected to the proximal end of the flexible arm (112). The conformable and displaceable members (124, 126) may include a non-slip layer (130) that may be include an elastomeric cover or coating. Conformable member (124) may include beads or pellets (131) maintained in a lubricious matrix, and circumjacent the central member (129). The beads are displaced by linear movement of the central member (129) and forcing the anchor member (123) to conform to a tool receptacle (TC). In some implementations, displaceable members (126) may include elements that move away from the axis (127) or toward the axis, depending on linear movement of the central member (129) within the anchor member (123). In some implementations, displaceable members (126) may be radially located about the central member (129) and may reciprocate linearly, having a resting position generally closer to the axis. In some implementations, portions of displaceable members (126) are biased toward the axis by spring or elastic elements (not shown) placed in a recess (134) of the anchor member (123) that bear against flanges (136) of the displaceable members (126). In some implementations displaceable members (126) may splay apart when portions of the movable central member (129) plungably move the displaceable members. Alternatively, an elastomeric band or cover circumjacent the displaceable members may bias the displaceable members in a retracted state. In various implementations, the displaceable members 126, 128 are displaced outwardly by linear movement of the central member 129. In some implementations, the diameter of the conformable member (124) is configured to change between a relatively lesser or greater diameter depending on the position of the central member (129) within the conformable member due to position of the displaceable members (131) circumjacent axis (127). When the diameter of the anchor member (123) is increased, portions thereof are tightly forced against the sides of the tool cradle (TC) and inhibit lateral movement of the conformable member. In some implementations, the anchoring member (123) may have conformable portions (124) that are forced apart and thereby increase the overall diameter of the anchoring member when the anchoring member is compressed from the top or bottom.

Figure 1:
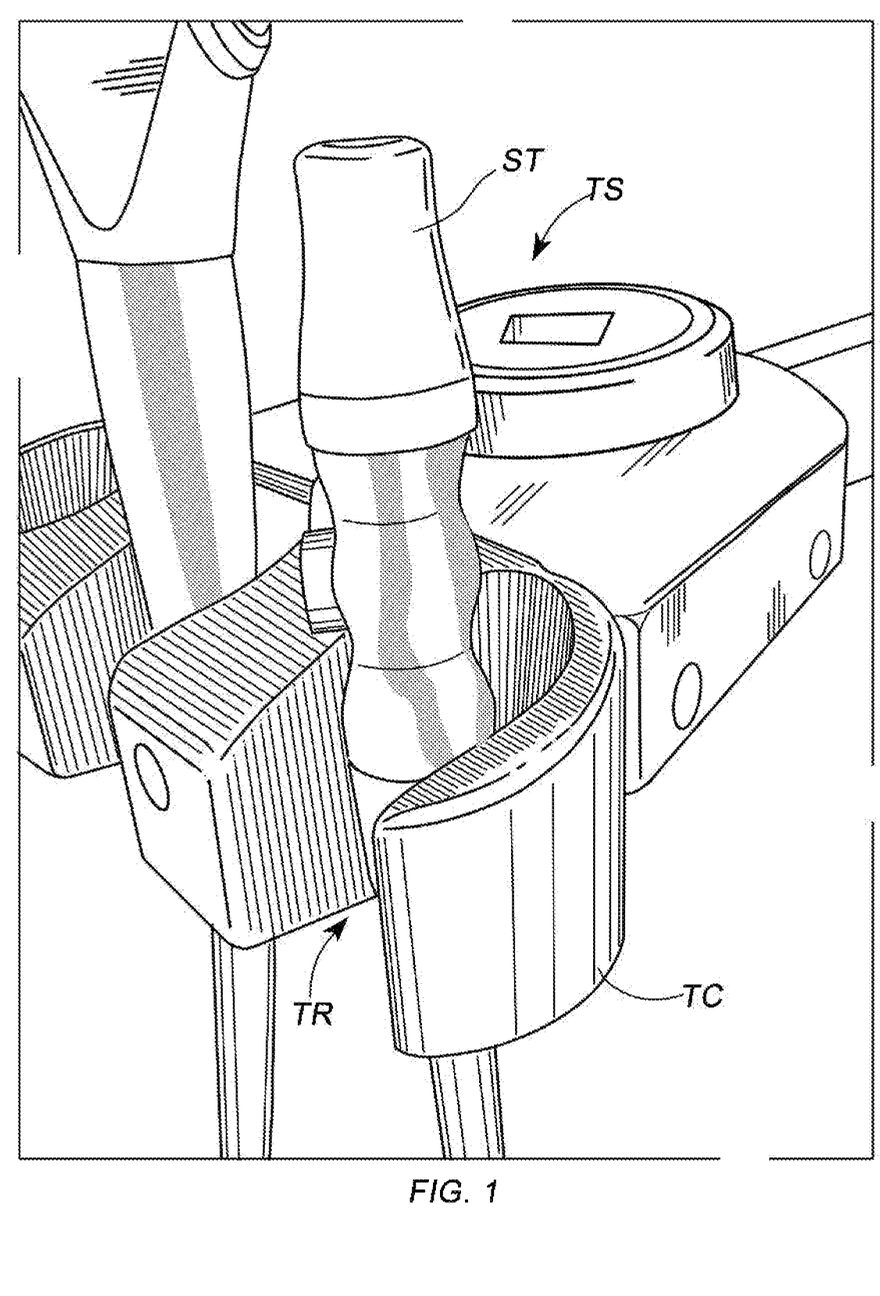
FIG. 1 is an environmental view showing a typical prior art dental tool holder.

FIG. 1 shows a prior art dental tool cradle (TC) which is typical of dental hygienist tool holders and includes a tapering, generally conic aperture with a gap along one side to allow ready access to a held tool.

Figures 2A, 2B, 3:
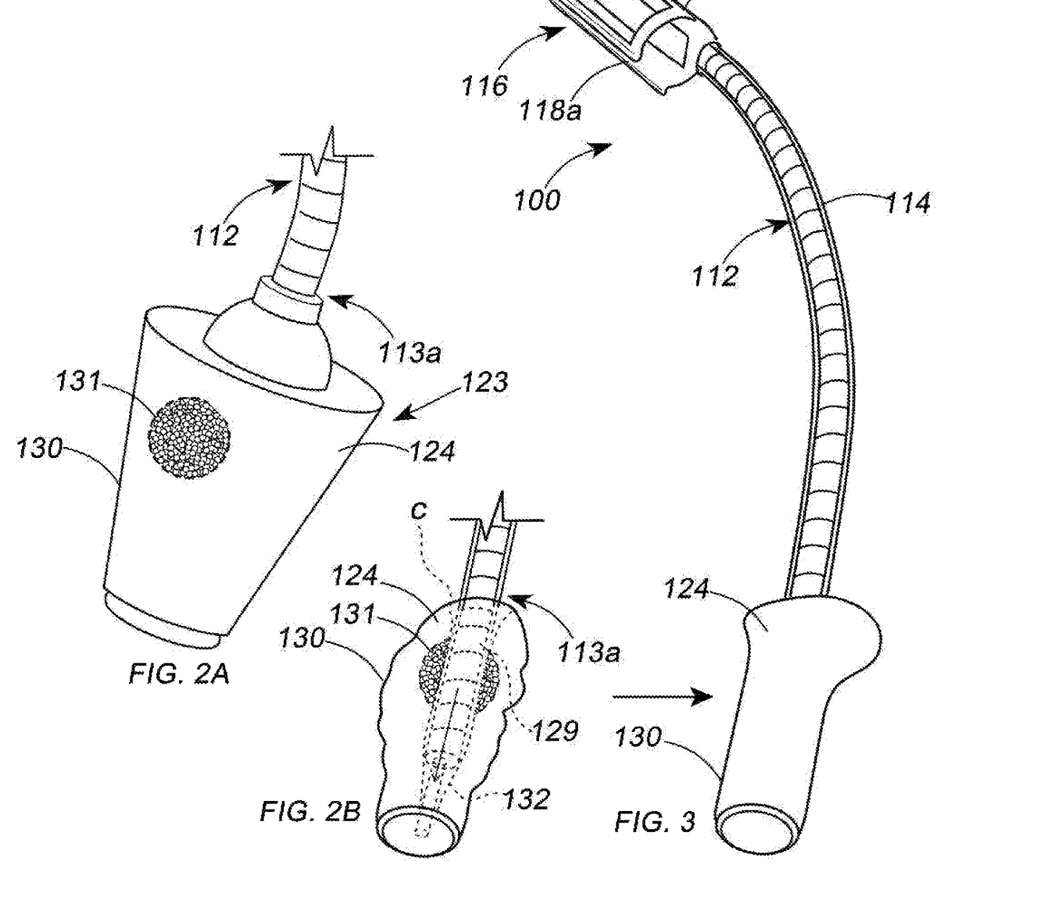
FIGS. 2A and 2B are partial views of various implementations in accordance with the present invention.
FIG. 3 is a perspective view thereof.

FIGS. 2A and 2B depict an implementation according to the present invention wherein the conformable members (124) inside anchor member (123) are spherical beads circumjacent central member (129) which may be thought of as a proximal extension of the flexible arm (112) that passes through the anchor member (123). When the anchor member (123) is placed in a tool receptacle (TR) of a tool cradle (TC), and the central member (129) is forced or plunged in a downward direction, beads (131) are forced away from the center of the anchor member (123) and distends the anchor member which is adapted to fill the inner contours of a prior art tool cradle such as that depicted in (FIG. 1). In the particular implementation shown, the beads are contained in the body of the anchor member (131) which is malleable and is able to maintain a shape, however in other implementations, the anchor member (131) includes some resilient elements, such as an elastomeric outer wall (130) or cover. In some implementations, the conformable members (131) are in a matrix of lubricious gel, and the conformable members (131) are covered by an elastomeric layer or cover or a layer of memory foam which contracts and bulges according to the movement of the spherical beads. In some implementations, the conformable members (131) are spherical beads which are magnetic and which are capable of maintaining a position and accordingly, an overall shape of the aggregate conformable members and the anchor member (123). In some implementations, the spherical beads are replaced with memory foam or sand. In some implementations the displaceable members are made at least partially of a heavy metal. FIG. 2B shows a typical unformed conformable member prior to insertion into a tool recess, and FIG. 3 shows the conformable member of FIG. 2B joined to flexible arm (112) wherein the contour of the anchor member (123) has been altered by insertion into a tool receptacle (TR) of a dental tool holder similar to that shown in (FIG. 1); one of many possible contours when the conformable members (131) are forced outwardly.

Figure 4:
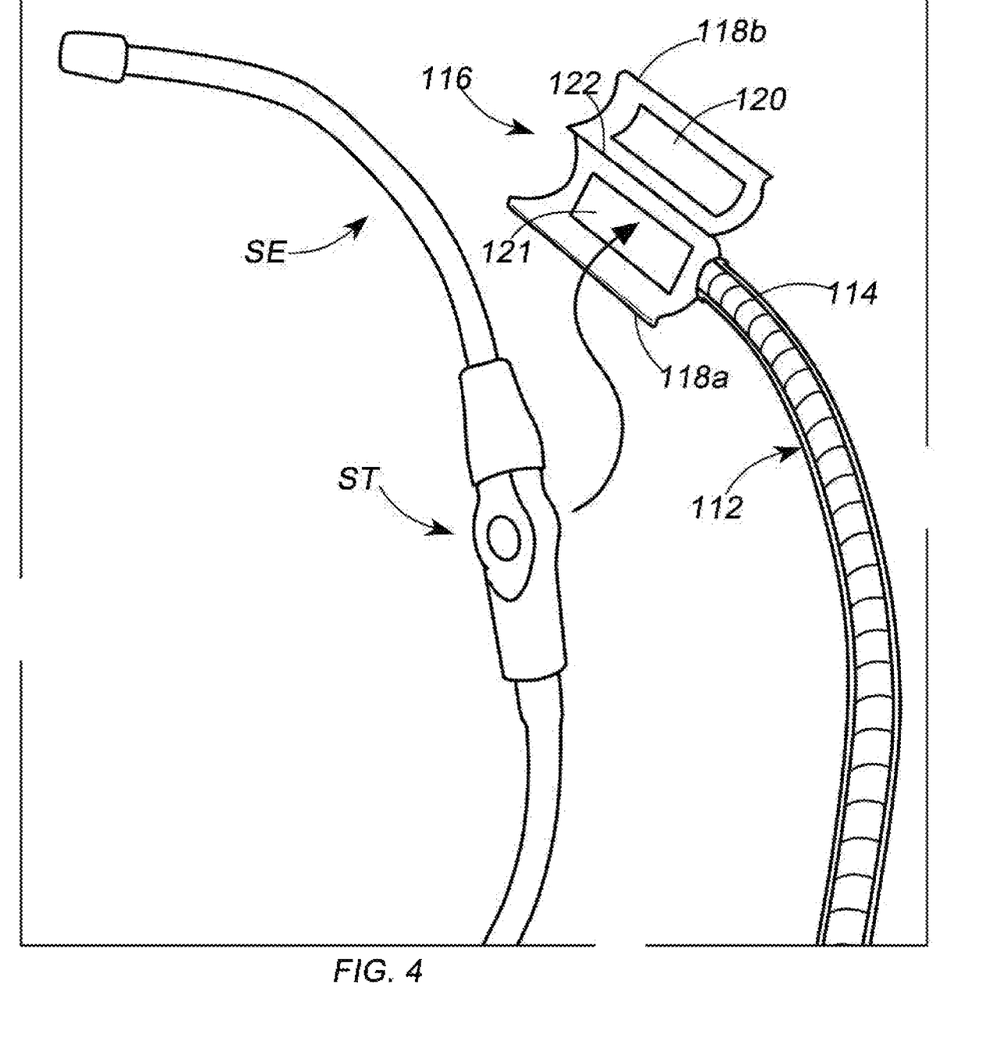
FIG. 4 is partial perspective view showing a dental suction device and a distal end of the implementation shown in (FIG. 3)
Figure 5:
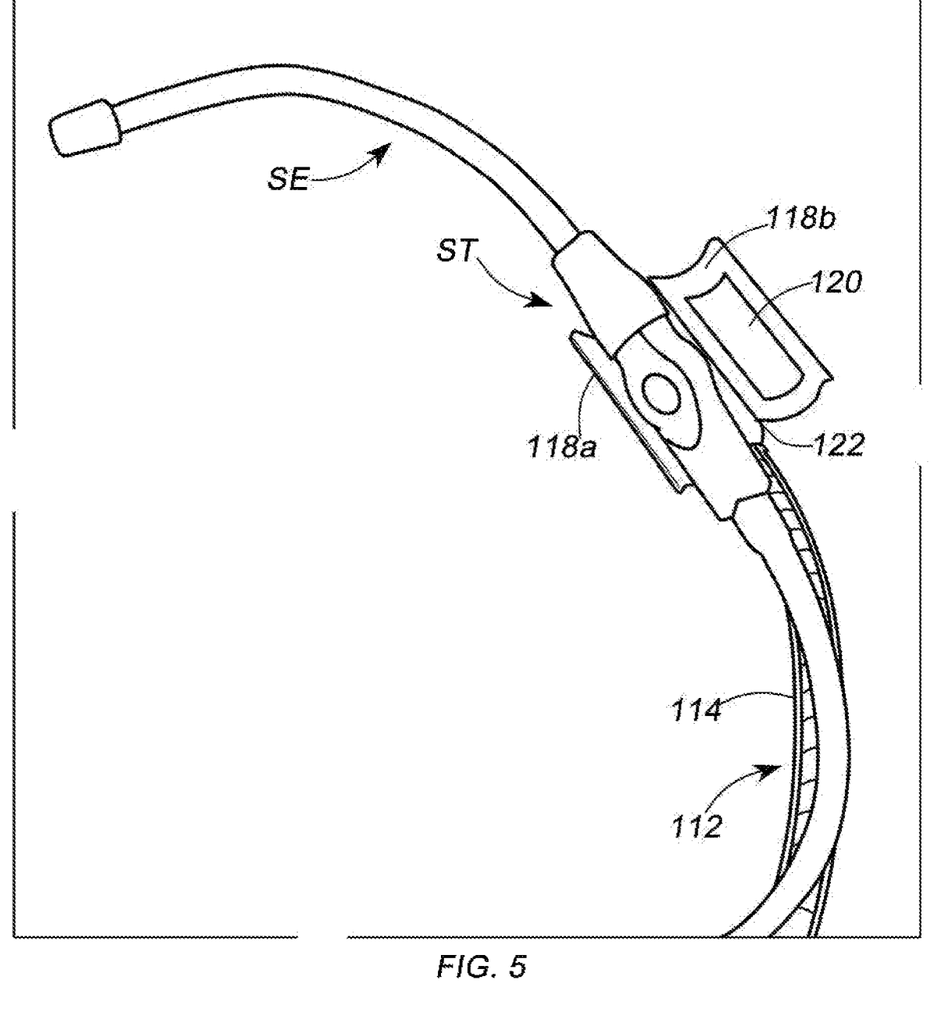
FIG. 5 is another partial perspective view thereof.

While FIGS. 4 and 5 show the flexible arm (112) with an upper tool grip (116) that includes hinge portion (122) between tool attachment members (118a, 118b), in some cases a magnet may be affixed to a dental tool (ST) corresponding to a magnetic element placed on or adjacent to compressible or magnetic member (121). In the clamshell type grip shown, a window (120) may be placed on one or more of the tool attachment members in order to expose controls on sides of the dental tool (ST). Tool attachment members (118a, 118b) may be biased to maintain a normally closed position unless the tool attachment members are prised apart.

Figure 6:
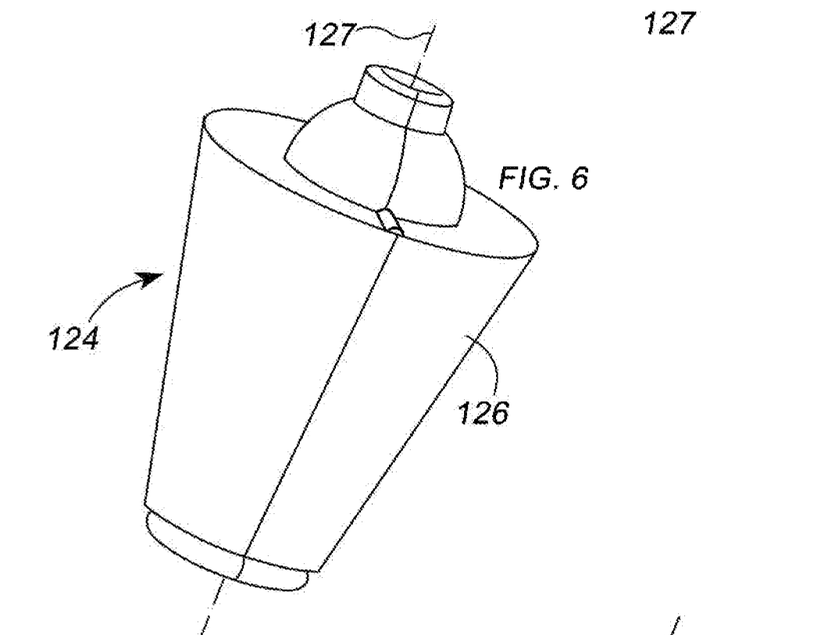
FIGS. 6 and 7 are isometric views of another implementation in accordance with the present invention showing a conformable member.
Figure 7:
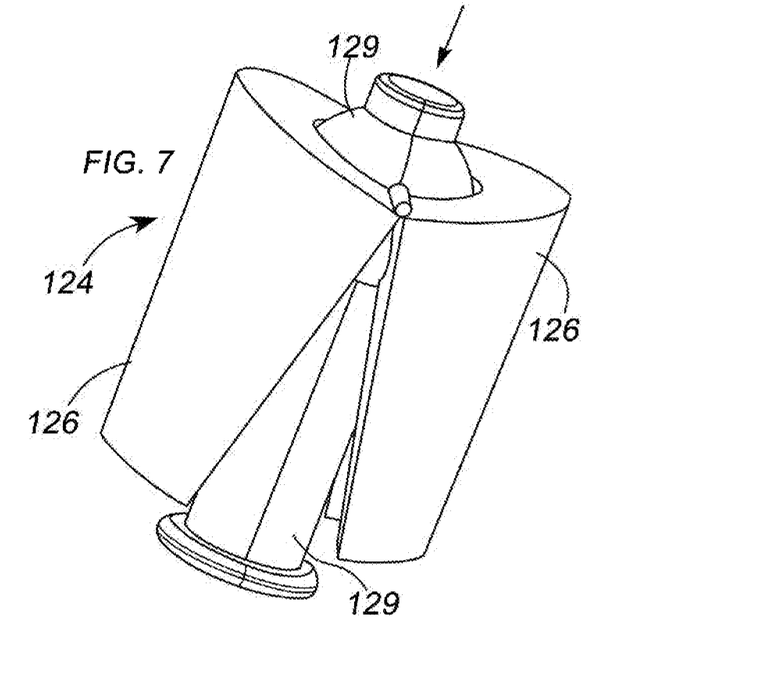

FIGS. 6 and 7 depict an implementation where the central member (129) includes tapering portions that are linearly movable within the conformable member (124) so that relatively larger diameter portions of the central member may transition between interior abutting portions of the conformable member of lesser diameter. The conformable member includes a hinge (123) that permits halves of the conformable member to splay when relatively greater diameter portions of the central member (129) are moved against relatively lesser diameter interior portions of the conformable member, and permits the halves to collapse together when relatively lesser diameter portions of the central member are moved against or disposed within relatively greater diameter portions of the conformable member. The halves may be coated or otherwise layered with a non-slip coating. The halves may include an elastic circumjacent band that provides contractile force. Alternatively, the halves may be encapsulated within an elastomeric bladder that includes a wall sufficiently thin such that the halves may expand when forced outwardly, yet contract when the central member is in the up position. While the implementation shown includes halves, it is possible that it be divided into quarters or another number of movable parts.

Figure 8:
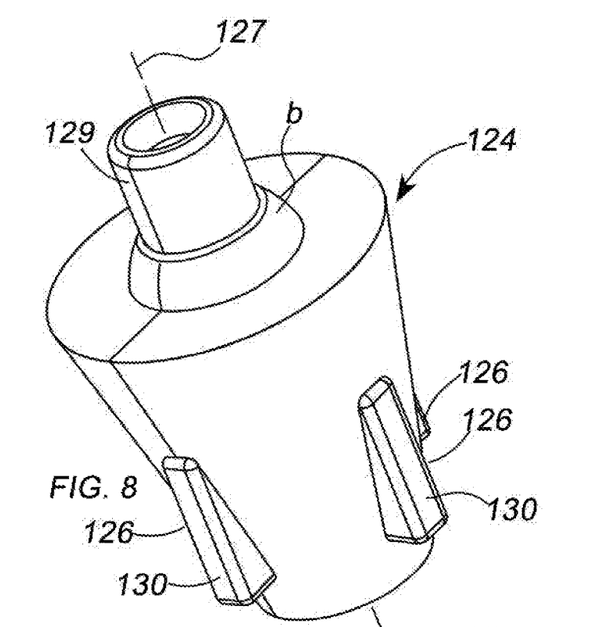
FIGS. 8 and 9 are isometric views of yet another implementation in accordance with the present invention.
Figure 9:
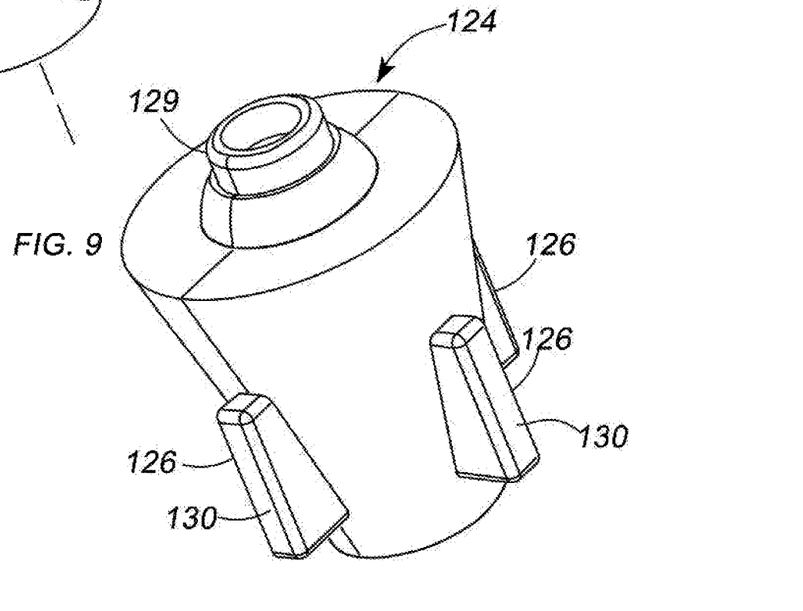
Figure 10:
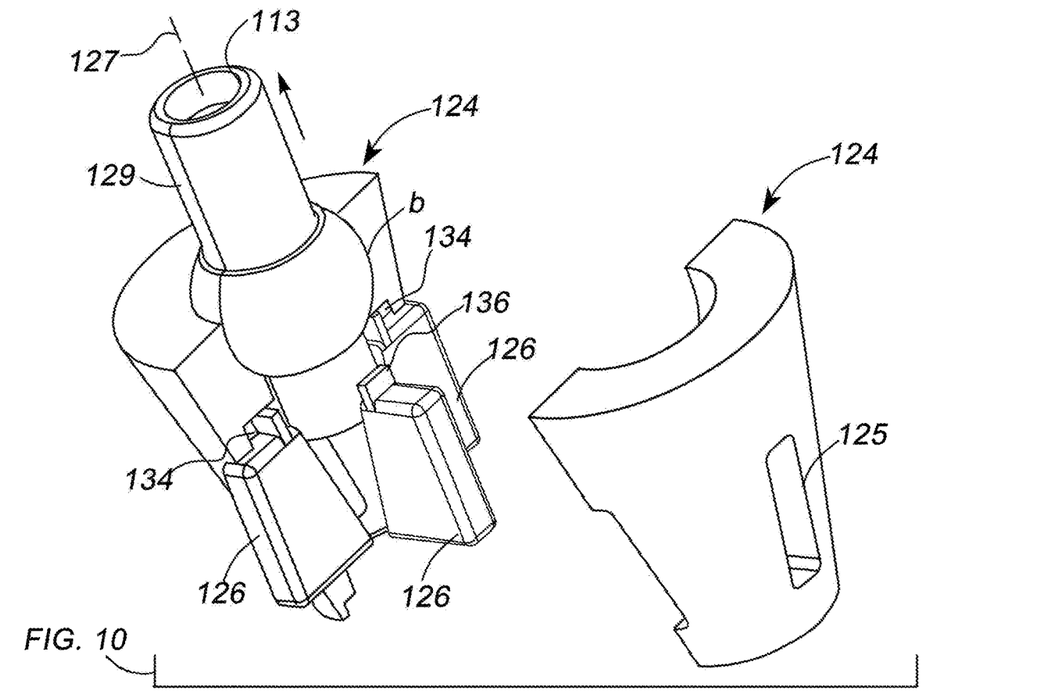
FIGS. 10 and 11 are exploded views of the implementation shown in (FIGS. 8 and 9)
Figure 11:
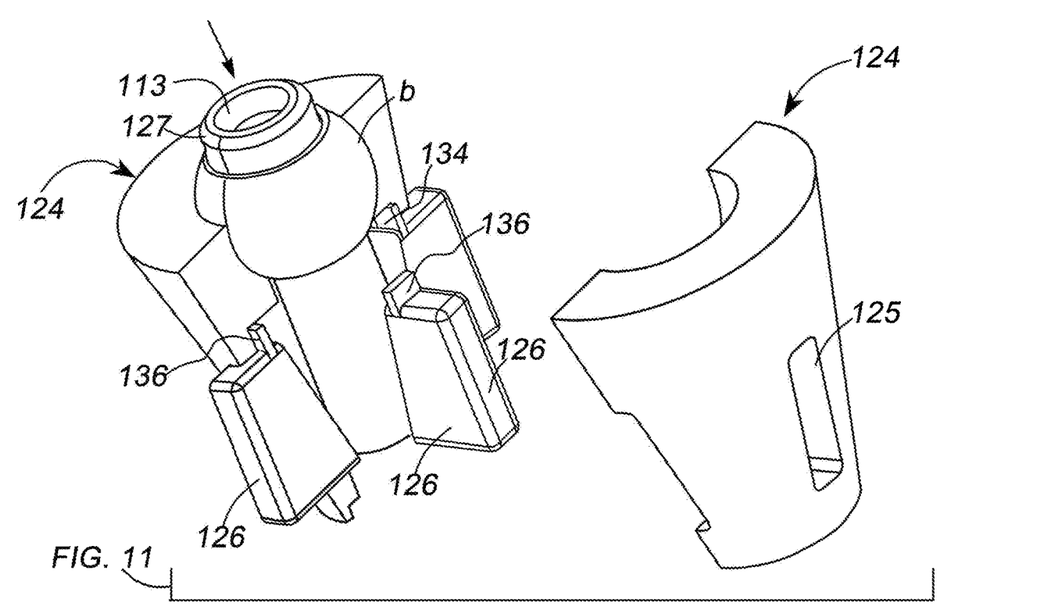

FIGS. 8 and 9 depict another implementation that includes displaceable members (126) that are arranged radially about axis (127). In similar fashion to the implementation shown in FIGS. 6 and 7, the central member is linearly movable within the anchoring member (123). FIGS. 10 and 11 show respectively, the implementation in a contracted (lesser diameter) state and an expanded (greater diameter) state. Displaceable members (126) are normally biased in a contracted state by springs (not shown) placed in recesses (134). In the implementation shown, the displaceable members are sloped so that forcing the central member downwardly forces the displaceable members outwardly through apertures (125). The expandable members may be coated with a non-slip material such as an elastomeric material.

Figure 12:
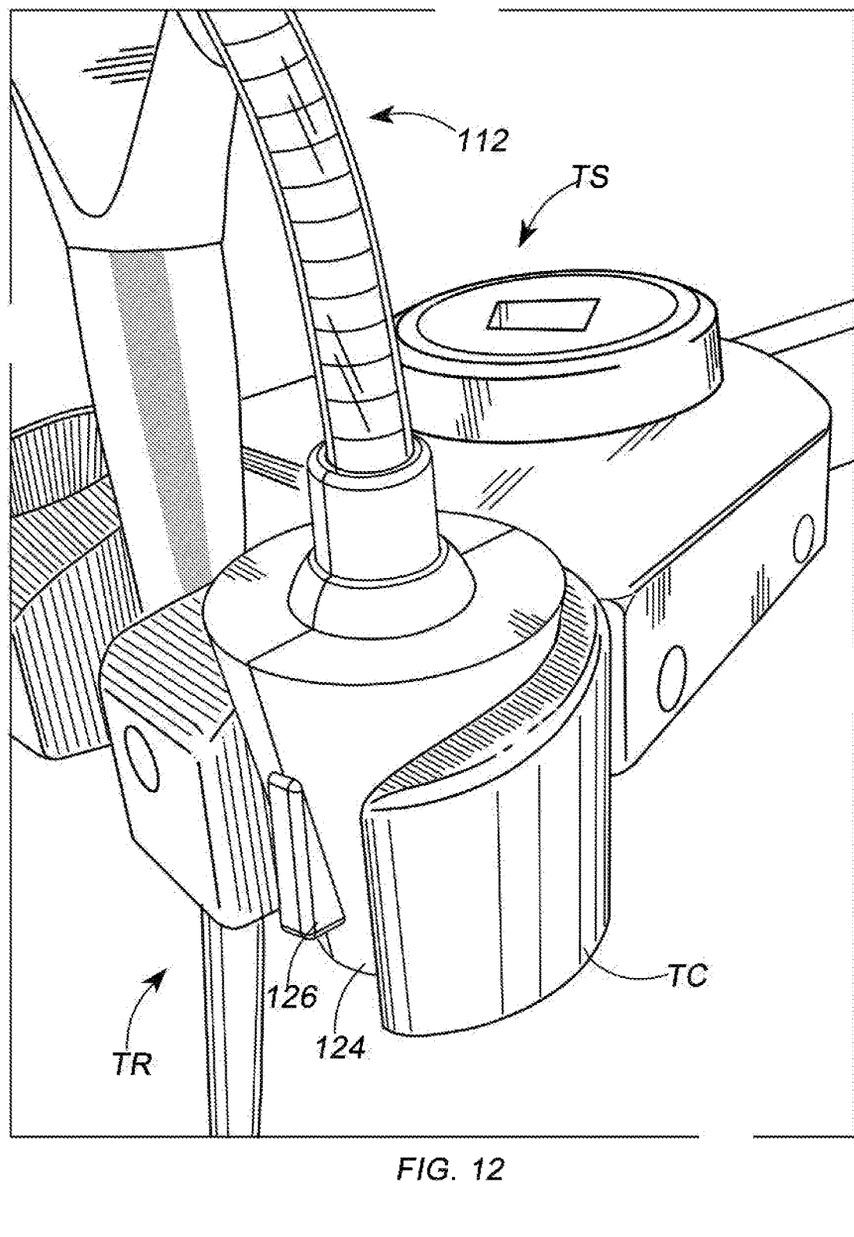
FIG. 12 depicts a typical environmental use of one or more implementations in accordance with the present invention.

FIG. 12 depicts the foregoing implementation in an expanded clamped state inside a tool recess of a tool cradle.

Figure 13:
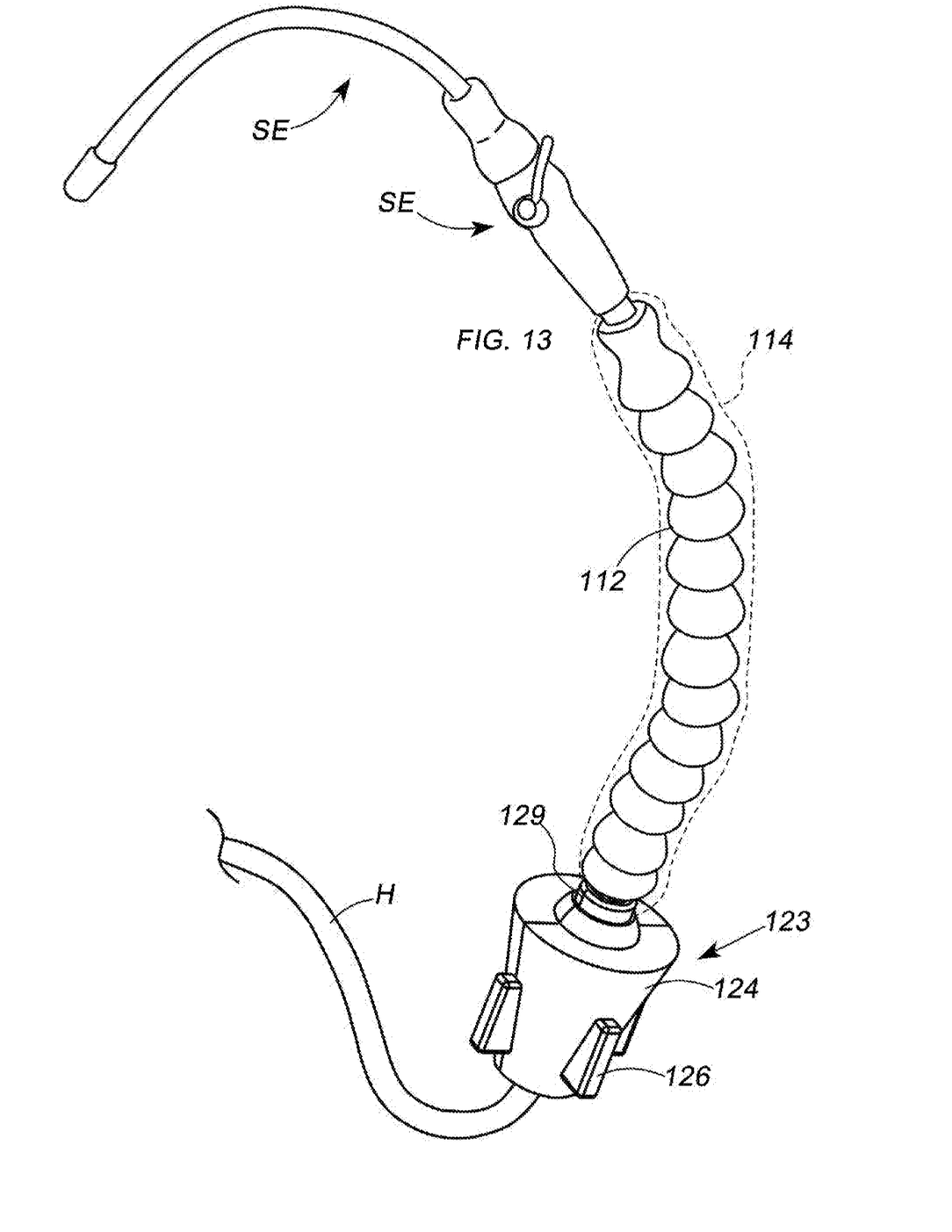
FIG. 13 shows an implementation that includes a segmented flexible member with a passageway permitting the insertion of a hose therethrough.
Figures 14, 15:
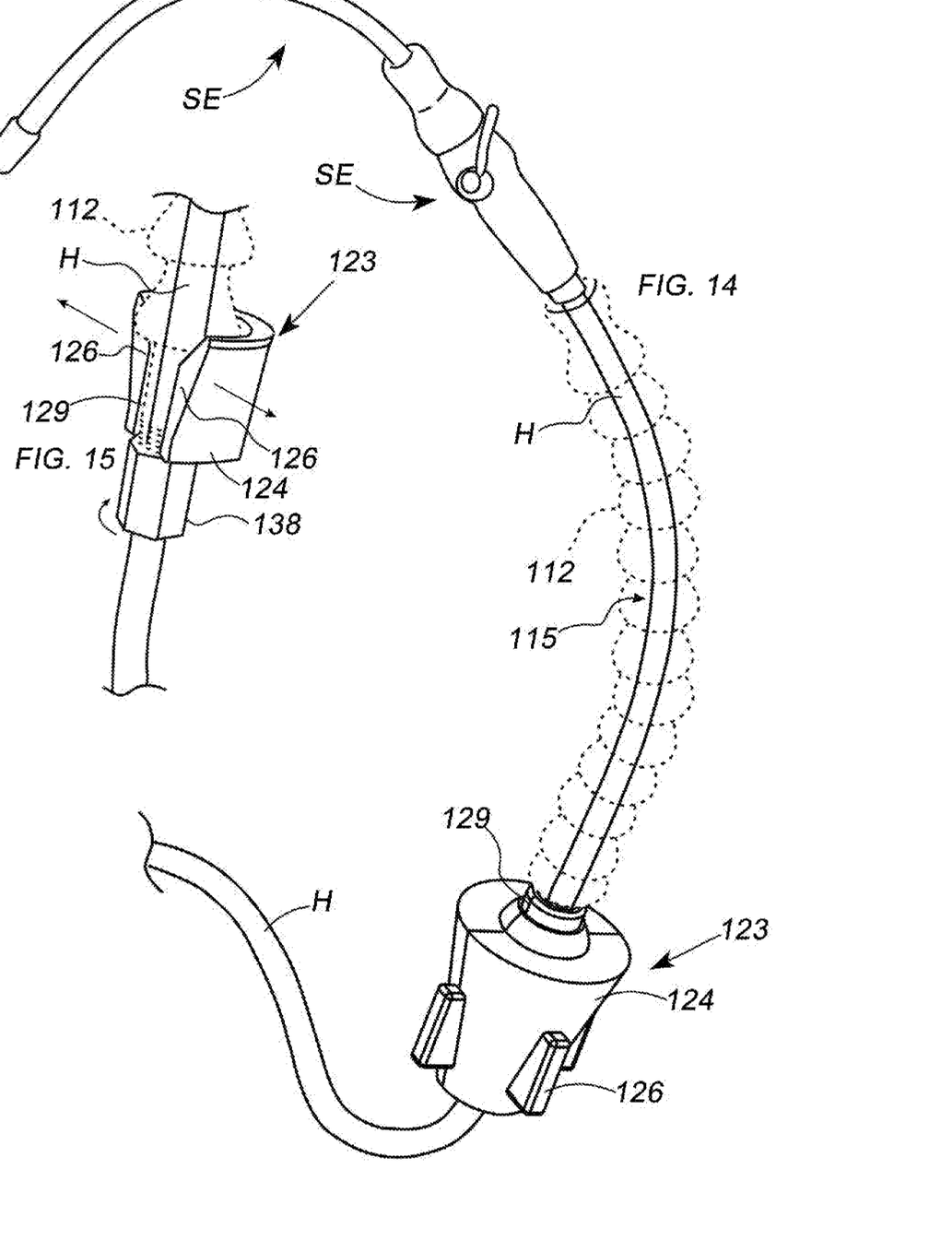
FIG. 14 shows disposition of a hose within the flexible member.
FIG. 15 shows another implementation that includes a conformable member with a passageway permitting the passing through of a hose.

FIGS. 13 and 14 depict an implementation that includes a multi-segmented flexible arm (112) that includes a passageway (115) adapted for the passing through of a hose— whether for air or water. A disposable or permanent sheath (114) may be placed over the arm (112) to protect the arm from debris. The tubular multi-segmented flexible arm may be combined with any of the anchoring members (123) described herein—any of which may include a passageway (132) for the passing through of a hose (H).

Figure 16:
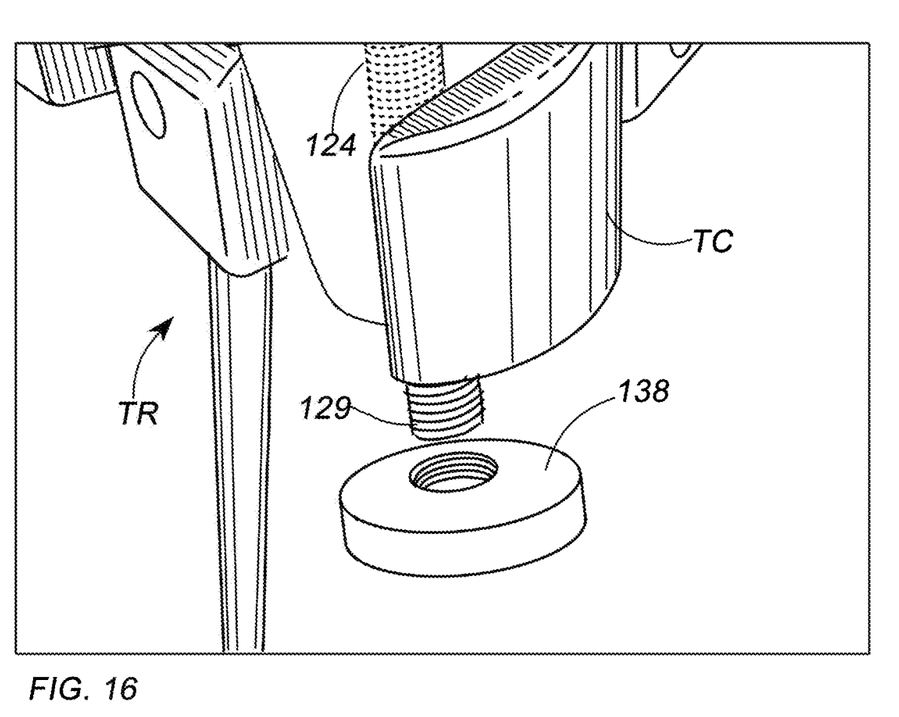
FIG. 16 is an enlarged partial view showing the implementation of (FIG. 15) mounted in a tool cradle recess, and the tightener member (138) threadable around central member (129).

FIGS. 15 and 16 show an implementation similar to that shown in (FIG. 14) that includes an anchoring member (123) that may expand slightly along an outer diameter when threaded tensioner (138) is tightened on the core (129). Tensioner (138) which may be a threaded knob, is turned along a threaded central member (129) and thereby pulls the anchoring member (123) into a snug/wedged disposition within the recess of the tool cradle. In other implementations, relatively larger diameter portions of the anchoring member may be pulled slightly downwards, or the bottom and top of the anchoring member compressed and thereby expanded, as the anchoring member is compressed by the tightener member (138) to more tightly wedge in the tool cradle.

In some of the implementations shown, a central member (129) is linearly movable between portions of a anchoring member (123) and displaces one or more elements (124, 126) to increase or decrease the diameter of the anchoring member. Interior portions of the anchoring member (123) in contact with the central member may have a high co-efficient of friction so that slight lateral forces encountered by the flexible arm while in use will not be sufficient to overcome the positional relationship of the movable elements. In other implementations, the central member may be threaded.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A tool holder apparatus comprising:
a bendable portion including a first end and a second end opposite the first end, the bendable portion configured to maintain a position when bent;
a tool holder portion located at the first end; and,
a tool cradle grip located at the second end, the tool cradle grip including at least one anchoring member adapted to wedge snugly in a tool cradle, and a tightener member adapted to secure the anchoring member in the tool cradle.

2. The tool holder apparatus according to claim 1, the bendable portion including a passageway therethrough.

3. The tool holder apparatus according to claim 1 further comprising a threaded post.

* * * * *